United States Patent
Gao et al.

(10) Patent No.: US 8,505,925 B2
(45) Date of Patent: Aug. 13, 2013

(54) TEMPERATURE ADAPTIVE DYNAMIC SHAFT SEAL ASSEMBLY

(75) Inventors: Xiujie Gao, Troy, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 840 days.

(21) Appl. No.: 12/635,882

(22) Filed: Dec. 11, 2009

(65) Prior Publication Data

US 2010/0102518 A1    Apr. 29, 2010

Related U.S. Application Data

(63) Continuation-in-part of application No. 11/536,022, filed on Sep. 28, 2006, now abandoned.

(51) Int. Cl.
*F16J 15/32* (2006.01)
*F16J 15/00* (2006.01)

(52) U.S. Cl.
USPC ............ 277/553; 277/557; 277/578; 277/931

(58) Field of Classification Search
USPC .................. 277/551, 557, 931, 932, 553, 578
See application file for complete search history.

(56) References Cited

U.S. PATENT DOCUMENTS

| | | | |
|---|---|---|---|
| 3,223,426 A * | 12/1965 | Reid | ............................. 277/647 |
| 3,361,430 A | 1/1968 | Reid | |
| 3,604,716 A | 9/1971 | Webert | |
| 3,813,105 A | 5/1974 | McQueen | |
| 4,240,643 A | 12/1980 | Becker et al. | |
| 4,424,865 A | 1/1984 | Payton, Jr. | |
| 4,429,854 A | 2/1984 | Kar et al. | |
| 4,445,694 A | 5/1984 | Flaherty | |
| 4,658,847 A | 4/1987 | McCrone | |
| 4,747,603 A | 5/1988 | Sugino et al. | |
| 4,907,788 A * | 3/1990 | Balsells | ........................ 267/168 |
| 5,000,464 A | 3/1991 | Yasui | |
| 5,171,024 A | 12/1992 | Janocko | |
| 5,265,890 A * | 11/1993 | Balsells | ........................ 277/467 |
| 5,368,312 A | 11/1994 | Voit et al. | |
| 5,979,828 A * | 11/1999 | Gruensfelder et al. | .... 244/129.1 |

(Continued)

FOREIGN PATENT DOCUMENTS

| | | |
|---|---|---|
| JP | 60168970 A | 9/1985 |
| JP | 8-166064 A | 6/1996 |
| JP | 2003-262276 A | 9/2003 |

OTHER PUBLICATIONS

Michael Feld, Alan Muhr, "Engineering Seals—Seals for Rotating Shafts", http://www.azom.com/details.asp?ArticleID=504, pp. 1-6.

(Continued)

*Primary Examiner* — Vishal Patel
*Assistant Examiner* — Nicholas L Foster
(74) *Attorney, Agent, or Firm* — Quinn Law Group, PLLC

(57) ABSTRACT

A seal assembly configured for sealing a dynamic shaft includes an elastic seal member disposable in sealing communication with the dynamic shaft. The seal assembly further includes a coil spring and a shape memory alloy element. The coil spring is disposed in contact with the elastic seal member and configured for applying a compressive force to the elastic seal member. The shape memory alloy element is configured for applying pressure to the coil spring to thereby augment the compressive force.

20 Claims, 5 Drawing Sheets

(56) References Cited

U.S. PATENT DOCUMENTS

| | | | |
|---|---|---|---|
| 6,547,250 | B1 | 4/2003 | Noble et al. |
| 6,860,485 | B2 * | 3/2005 | Masuyama et al. ........... 277/434 |
| 2005/0012277 | A1 | 1/2005 | Adrion et al. |
| 2005/0242521 | A1 | 11/2005 | Bock et al. |
| 2006/0163818 | A1 * | 7/2006 | Breen ........................... 277/553 |
| 2008/0079222 | A1 | 4/2008 | Namuduri et al. |
| 2008/0296849 | A1 * | 12/2008 | Alacqua et al. ............... 277/593 |
| 2009/0226691 | A1 | 9/2009 | Mankame et al. |

OTHER PUBLICATIONS

Office Action for U.S. Appl. No. 11/536,022 mailed on Feb. 12, 2009.
Office Action for U.S. Appl. No. 11/536,022 mailed on Jun. 25, 2009.

* cited by examiner

TEMPERATURE ADAPTIVE DYNAMIC SHAFT SEAL ASSEMBLY

CROSS-REFERENCE TO RELATED APPLICATIONS

This application is a continuation-in-part of U.S. patent application Ser. No. 11/536,022, filed on Sep. 28, 2006.

TECHNICAL FIELD

The present invention generally relates to seal assemblies, and more specifically, to seal assemblies configured for sealing dynamic shafts.

BACKGROUND OF THE INVENTION

Dynamic shafts, e.g., rotating, reciprocating, and/or oscillating shafts, often require seal assemblies capable of preventing ingress or egress of fluids and contaminants into and/or out of a region. Therefore, seal assemblies often include an elastic seal member capable of pressing against the dynamic shaft to form a seal. Such seal assemblies must often perform within specified leakage rates and maximum friction tolerances for a given operating temperature.

However, leakage rates and maximum friction tolerances are often competing requirements. For example, increased compression force is generally required to hold the elastic seal member against the dynamic shaft and minimize leakage. However, increased compression force also often increases friction between the elastic seal member and the dynamic shaft, accelerates wear, and shortens a service life of the seal assembly. Conversely, reduced compression force often results in a poor seal and an undesirable leakage rate.

SUMMARY OF THE INVENTION

A seal assembly configured for sealing a dynamic shaft includes an elastic seal member disposable in sealing communication with the dynamic shaft. Further, the seal assembly includes a combination of a coil spring and a shape memory alloy element. The coil spring is disposed in contact with the elastic seal member and is configured for applying a compressive force to the elastic seal member. The shape memory alloy element is configured for applying pressure to the coil spring to thereby augment the compressive force.

In one variation, the elastic seal member is disposed in sealing communication with the dynamic shaft. The shape memory alloy element changes crystallographic phase between martensite and austenite at a transformation temperature to thereby change dimension and augment the compressive force in a radial direction generally perpendicular to the dynamic shaft. Further, the seal assembly includes a power source in communication with the shape memory alloy element. The power source is configured for changing a temperature of the shape memory alloy element. Moreover, the power source is changeable between an energized mode configured for dimensionally contracting the shape memory alloy element and a non-energized mode configured for dimensionally expanding the shape memory alloy element.

In another variation, the shape memory alloy element has a first end section and a second end section. Additionally, the seal assembly includes a crimp configured for tying the first end section of the shape memory alloy element to the second end section inside the coil spring.

The seal assemblies of the present invention provide excellent adjustable sealing against dynamic shafts, e.g., rotating, reciprocating, and/or oscillating shafts. In particular, the seal assemblies provide adjustable compression force and on-demand sealing across a range of operating pressures and temperatures to minimize unnecessary friction and wear between the elastic seal member and the dynamic shaft. Therefore, the seal assemblies exhibit minimal friction and leaking between the elastic seal member and the dynamic shaft, and excellent elastic seal member service life, durability, and reliability. Additionally, the shape memory alloy elements of desired length apply uniform pressure along an entire length of the shape memory alloy element, and therefore, minimize undesired rubbing between the coil spring and the shape memory alloy element. The crimp further minimizes such undesired rubbing. The seal assemblies are also cost-effective and suitable for operating conditions requiring elevated pressures.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
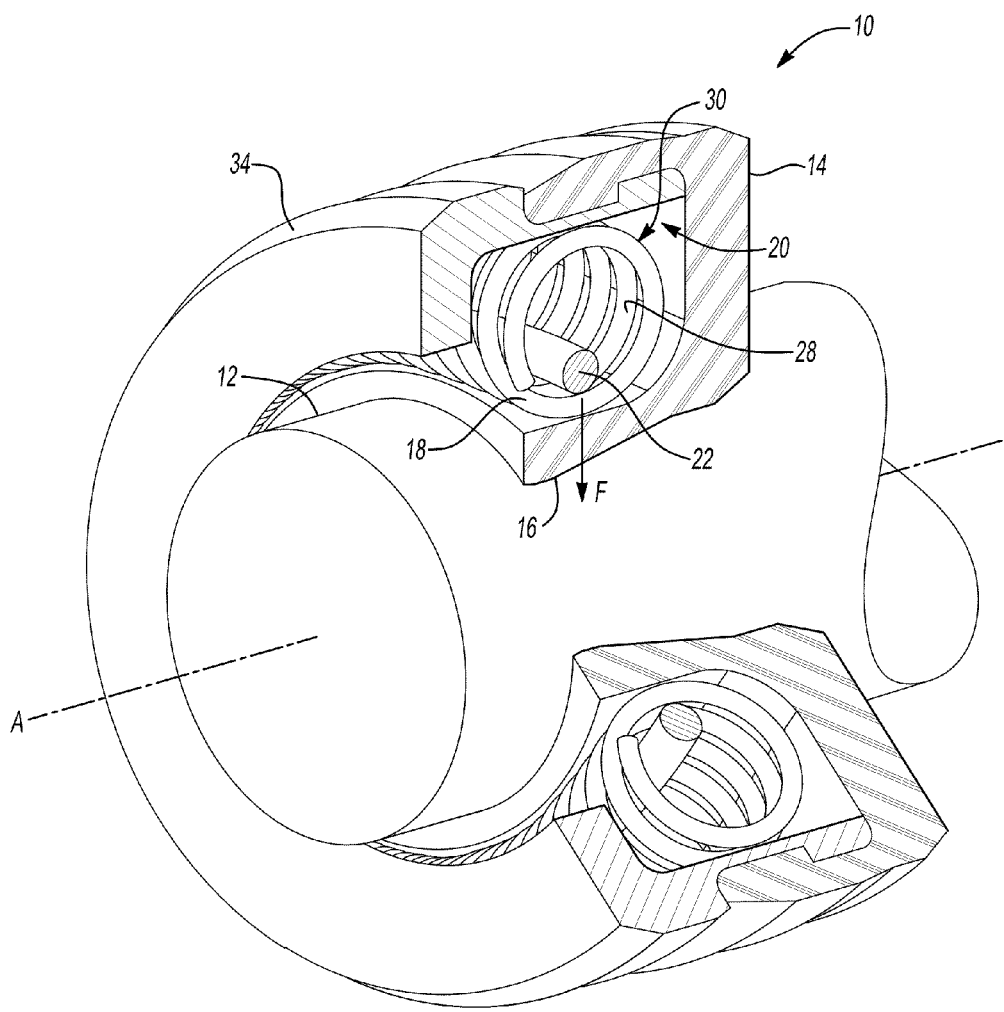
FIG. 1 is a schematic cross-sectional view of a seal assembly including an elastic seal member disposed in sealing communication with a dynamic shaft, a coil spring disposed in contact with the elastic seal member, and a shape memory alloy element in the form of a wire disposed in contact with the coil spring.

Referring to the Figures, wherein like reference numerals refer to like elements, a seal assembly is shown generally at 10 in FIG. 1. The seal assembly 10 is configured for sealing a dynamic shaft 12, e.g., a rotating, reciprocating, and/or oscillating shaft. Therefore, the seal assembly 10 may be useful for applications such as, but not limited to, automotive actuators and dampers in engine, transmission, driveline, suspension, and braking sub-systems. However, it is to be appreciated that the seal assembly 10 may also be useful for non-automotive applications such as, but not limited to, hydraulic industrial pumps, construction equipment gearbox assemblies, washing machine tubs, and high-pressure fire hoses.

Referring to FIG. 1, the seal assembly 10 includes an elastic seal member 14 disposable in sealing communication with the dynamic shaft 12. That is, the elastic seal member 14 may have at least a portion thereof, e.g., a seal lip 16, disposed in contact with the dynamic shaft 12 so as to form a seal with the dynamic shaft 12 that is adjustable based on operating conditions, e.g., temperature and pressure, of the seal assembly 10. The elastic seal member 14 closes off any gap between the seal assembly 10 and the dynamic shaft 12 under a given operating pressure and/or temperature. For example, the elastic seal member 14 may be formed from an elastomer and may press against the dynamic shaft 12, as set forth in more detail below.

The elastic seal member 14 may have any shape suitable for sealably communicating with the dynamic shaft 12. That is, the shape of the elastic seal member 14 may be determined according to the shape of the dynamic shaft 12. For example, for applications including a cylindrical, rotating dynamic shaft 12, the elastic seal member 14 may be generally toroidal in shape so as to snugly fit about a circumference of the dynamic shaft 12. That is, the elastic seal member 14 may circumferentially encircle at least a portion of the dynamic shaft 12.

Referring again to FIG. 1, the seal assembly 10 also includes a coil spring 18. The coil spring 18 is disposed in contact with the elastic seal member 14 and is configured for applying a compressive force to the elastic seal member 14. For example, as shown in FIG. 1, the elastic seal member 14 may define an interior channel 20 configured for receiving the coil spring 18. The coil spring 18 may be disposed within the interior channel 20 of the elastic seal member 14 so as to exert the compressive force in a radial direction, indicated by arrow F in FIG. 1, generally perpendicular to the dynamic shaft 12, e.g., generally perpendicular to a central longitudinal axis A of the dynamic shaft 12.

The coil spring 18 may be formed from a material selected from the group including metal, plastic, composites, and combinations thereof. Further, the coil spring 18 may or may not be canted. In one example, the coil spring 18 may be toroidal and continuously encircle at least a portion of the elastic seal member 14, e.g., a surface of the interior channel 20 of the elastic seal member 14. For example, the coil spring 18 may be a garter spring capable of squeezing the elastic seal member 14.

Referring again to FIG. 1, the seal assembly 10 further includes a shape memory alloy element 22 configured for applying pressure to the coil spring 18 to thereby augment the compressive force, as set forth in more detail below. More specifically, the shape memory alloy element 22 has a crystallographic phase changeable between austenite and martensite in response to temperature.

As used herein, the terminology "shape memory alloy" refers to known alloys which exhibit a shape-memory effect and have the capability to quickly change properties in terms of stiffness, spring rate, and/or form stability. That is, the shape memory alloy element 22 may undergo a solid state phase change via molecular rearrangement to shift between a martensite phase, i.e., "martensite", and an austenite phase, i.e., "austenite" at a transformation temperature. Stated differently, the shape memory alloy element 22 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape memory alloy element 22 begins to change from the austenite phase to the martensite phase is known as the martensite start temperature, $M_s$. The temperature at which the shape memory alloy element 22 completes the change from the austenite phase to the martensite phase is known as the martensite finish temperature, $M_f$. Similarly, as the shape memory alloy element 22 is heated, the temperature at which the shape memory alloy element 22 begins to change from the martensite phase to the austenite phase is known as the austenite start temperature, $A_s$. And, the temperature at which the shape memory alloy element 22 completes the change from the martensite phase to the austenite phase is known as the austenite finish temperature, $A_f$.

Therefore, the shape memory alloy element 22 may be characterized by a cold state, i.e., when a temperature of the shape memory alloy element 22 is below the martensite finish temperature $M_f$ of the shape memory alloy element 22. Likewise, the shape memory alloy element 22 may also be characterized by a hot state, i.e., when the temperature of the shape memory alloy element 22 is above the austenite finish temperature $A_f$ of the shape memory alloy element 22.

In operation, i.e., when the shape memory alloy element 22 is at or above the transformation temperature, the shape memory alloy element 22 can change dimension, e.g., contract, upon changing crystallographic phase. That is, the shape memory alloy element 22 may change crystallographic phase from austenite to martensite at the transformation temperature to thereby change dimension, e.g., dimensionally contract, and augment the compressive force applied by the coil spring 18. It is to be appreciated that a change in dimension may include a change in shape orientation and/or modulus property. That is, the shape memory alloy element 22 may augment the compressive force to thereby compress the elastic seal member 14 against the dynamic shaft 12 in the direction of arrow F (FIG. 1). Conversely, the shape memory alloy element 22 may change crystallographic phase from martensite to austenite and thereby dimensionally expand so as to reduce the compressive force applied by the coil spring 18. The shape memory alloy element 22 may have a transformation temperature of from about −55° C. to about 250° C., e.g., from about 40° C. to about 150° C. Moreover, the transformation temperature may vary along a length of the shape memory alloy element 22.

The shape memory alloy element 22 may have any suitable composition. In particular, the shape memory alloy element 22 may include in combination an element selected from the group of cobalt, nickel, titanium, indium, manganese, iron, palladium, zinc, copper, silver, gold, cadmium, tin, silicon, platinum, and gallium. For example, suitable shape memory alloy elements 22 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy element 22 can be binary, ternary, or any higher order so long as the shape memory alloy element 22 exhibits a shape memory effect, e.g., a change in shape orientation, damping capacity, and the like. A skilled artisan, in accordance with this invention, may select the shape memory alloy element 22 according to desired operating temperatures and pressures of the seal assembly 10 (FIG. 1), as set forth in more detail below. In one specific example, the shape memory alloy element 22 may include nickel and titanium.

Further, the shape memory alloy element 22 may have any suitable form, i.e., shape. For example, the shape memory alloy element 22 may have a form of a shape-changing element. That is, the shape memory alloy element 22 may have a form selected from the group including springs, tapes, wires, bands, continuous loops, and combinations thereof. Referring to FIG. 1, in one variation, the shape memory alloy element 22 may be toroidal. For example, as set forth in more detail below, the shape memory alloy element 22 may be in the form of a continuous wire loop of desired length formed by tying a first end section 24 (FIGS. 6 and 7) and a second end section 26 (FIGS. 6 and 7) of the shape memory alloy element 22.

Referring again to FIG. 1, the coil spring 18 may define an interior surface 28 configured for receiving the shape memory alloy element 22, and an exterior surface 30 configured for at least partially contacting the elastic seal member 14. That is, the coil spring 18 generally forms a tunnel, i.e., the interior surface 28 of the coil spring 18, which is generally not in contact with the elastic seal member 14. In contrast, at least a portion of the exterior surface 30 of the coil spring 18 abuts the elastic seal member 14 so as to apply the compressive force, as set forth above.

As shown and described with respect to FIG. 1, the shape memory alloy element 22 may be of desired length and disposed in contact with the interior surface 28 of the coil spring 18. In this variation, upon contraction of the shape memory alloy element 22 at or above the transformation temperature, the shape memory alloy element 22 augments the compressive force applied by the coil spring 18 against the elastic seal member 14 and the dynamic shaft 12. For example, the shape memory alloy element 22 may have a length suitable for augmenting the compressive force applied by the coil spring 18, i.e., the shape memory alloy element 22 may have minimal slack so as to fit snugly around the circumference of the radial shaft 12. In this variation, the shape memory alloy element 22 may have the form of a wire loop that is suitably sized, i.e., has a suitable diameter and/or desired length, to fit within the coil spring 18.

Figure 2:
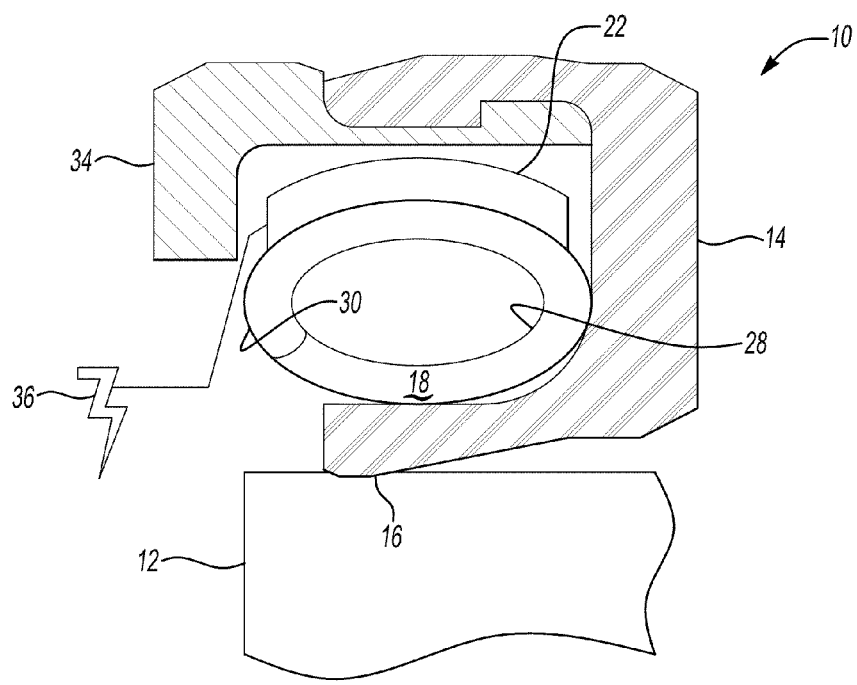
FIG. 2 is a schematic cross-sectional view of the seal assembly of FIG. 1 including the shape memory alloy element in the form of a band disposed in contact with the coil spring.

Referring to FIG. 2, in another variation, the shape memory alloy element 22 may be of desired length and disposed in contact with the exterior surface 30 of the coil spring 18. In this variation, upon contraction of the shape memory alloy element 22 at or above the transformation temperature, the shape memory alloy element 22 also augments the compressive force applied by the coil spring 18 against the elastic seal member 14 and the dynamic shaft 12. As shown in FIG. 2, in this variation, the shape memory alloy element 22 may have the form of a circular band that is suitable sized, i.e., has a suitable thickness and/or desired length, to surround at least a portion of the coil spring 18.

Figure 3:
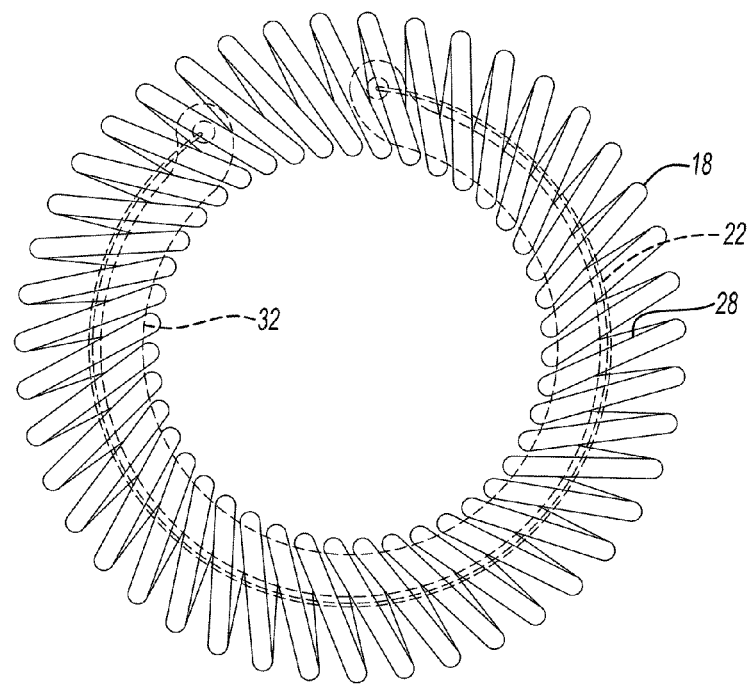
FIG. 3 is a schematic plan view of a clip coupled to the shape memory alloy element of FIG. 1 and disposed in contact with an interior surface of the coil spring of FIG. 1.

Referring to FIG. 3, in another variation, the seal assembly 10 may further include a clip 32 having a generally C-shape and configured for supporting substantially an entire length of the shape memory alloy element 22. That is, in this variation, the shape memory alloy element 22 may be in the form of a wire or tape and may be coupled to the clip 32 at two ends so that the shape memory alloy element 22 also has a generally C-shape. The clip 32 may be formed from a flexible material, e.g., metal, rubber, or plastic, so that in this configuration, the shape memory alloy element 22 may flex the clip 32 when contracting or expanding upon changing crystallographic phase.

As shown in FIG. 3, the clip 32 may be disposed in contact with the interior surface 28 of the coil spring 18. That is, the clip 32 and the coupled shape memory alloy element 22 may be disposed inside the coil spring 18. Therefore, in operation at or above the transformation temperature, the shape memory alloy element 22 may contract and open the clip 32 against coil spring 18 to thereby reduce the compressive force applied by the coil spring 18 against the elastic seal member 14 (FIG. 1) and the dynamic shaft 12 (FIG. 1). Conversely, in operation below the transformation temperature, the shape memory alloy element 22 may expand and increase the compressive force applied by the coil spring 18 against the elastic seal member 14 and the dynamic shaft 12.

Figure 4:
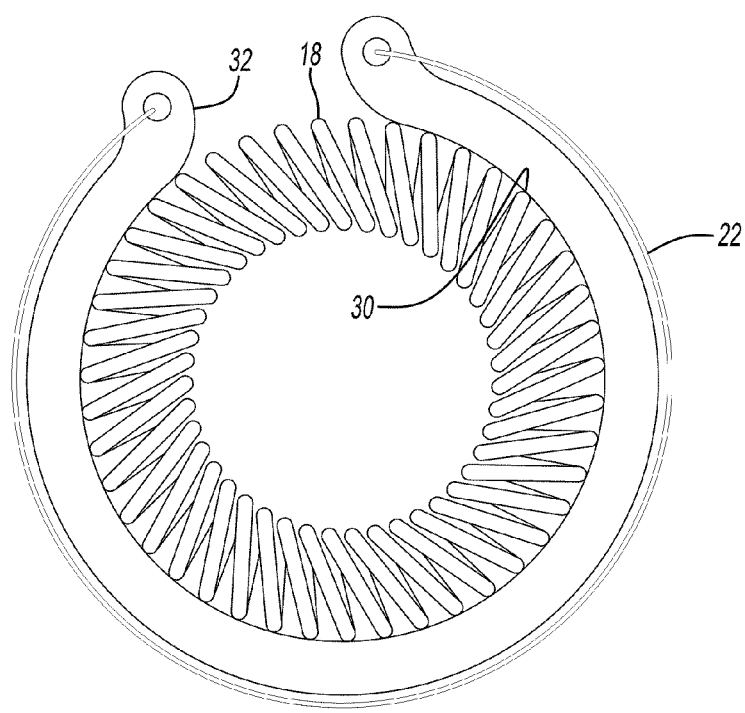
FIG. 4 is a schematic plan view of the clip of FIG. 3 coupled to the shape memory alloy element of FIG. 1 and disposed in contact with an exterior surface of the coil spring of FIG. 1.

Further, in another variation, referring to FIG. 4, the clip 32 may be disposed in contact with the exterior surface 30 of the coil spring 18. That is, the clip 32 and the coupled shape memory alloy element 22 may mate with at least a substantial portion of the exterior surface 30 of the coil spring 18. Therefore, in operation at or above the transformation temperature, the shape memory alloy element 22 may contract and compress and open the clip 32 against the coil spring 18 to thereby reduce the compressive force applied by the coil spring 18 against the elastic seal member 14 (FIG. 1) and the dynamic shaft 12 (FIG. 1). Conversely, in operation below the transformation temperature, the shape memory alloy element 22 may expand and increase the compressive force applied by the coil spring 18 against the elastic seal member 14 and the dynamic shaft 12.

Figure 5:
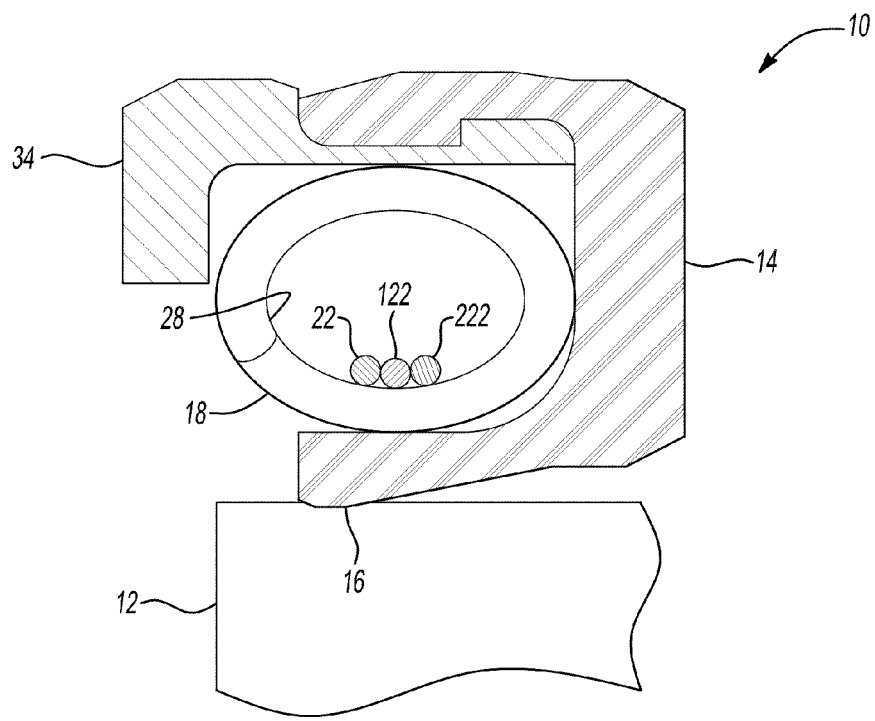
FIG. 5 is a schematic cross-sectional view of another variation of the seal assembly of FIG. 1 including a power source in communication with the shape memory alloy element.

Referring now to FIG. 5, the seal assembly 10 may include a plurality of shape memory alloy elements 22, 122, 222 wherein each shape memory alloy element 22, 122, 222 has a different transformation temperature. That is, one shape memory alloy element 22 may change dimension, i.e., expand or contract, at a relatively lower transformation temperature than another shape memory alloy element 22. Therefore, the plurality of shape memory alloy elements 22, 122, 222 may transform, i.e., change dimension, at a plurality of transformation temperatures to thereby provide an adjustable compression force applied by the coil spring 18. For example, the plurality of shape memory alloy elements 22, 122, 222 may gradually augment the compression force according to an increasing operating temperature.

Referring to FIG. 5, at least one of the plurality of shape memory alloy elements 22, 122, 222 may be disposed in contact with the coil spring 18. Alternatively, each of the shape memory alloy elements 22, 122, 222 may be disposed in contact with the coil spring 18. Further, each shape memory alloy element 22 may have the same or different form, i.e., shape, from another shape memory alloy element 122, 222. For example, the shape memory alloy elements 22, 122, 222 may be braided into a continuous wire rope, may be stacked into a continuous band having multiple layers, and/or may line the entire interior surface 28 of the coil spring 18.

Referring again to FIG. 1, the seal assembly 10 may also include a rigid housing 34 in structural communication with the elastic seal member 14. For example, the rigid housing 34 may supportably mate with the elastic seal member 14 to provide structural rigidity to the seal assembly 10. As shown in FIGS. 1 and 5, the coil spring 18 may abut the rigid housing 34 and the elastic seal member 14. The rigid housing 34 may be formed from any suitable material, including, but not limited to, metal, plastic, composites, and combinations thereof. Further, the rigid housing 34 may have any suitable shape. For example the rigid housing 34 may also be generally toroidal so as to circumferentially encircle the dynamic shaft 12.

In operation, as set forth above, and described with general reference to FIGS. 1, 2, and 5, the shape memory alloy element 22 applies adjustable pressure to the coil spring 18 to thereby augment the compressive force applied to the elastic seal member 14 and dynamic shaft 12 by the coil spring 18. More specifically, the pressure is adjustable according to a temperature of the shape memory alloy element 22. That is, at temperatures at or above the transformation temperature, the shape memory alloy element 22 contracts so as to augment the compressive force applied by the coil spring 18. Therefore, when the transformation temperature of the shape memory alloy element 22 is selected to equal a threshold operating temperature of the seal assembly 10, e.g., an operating temperature that is known to soften the elastic seal member 14 and reduce the effectiveness of the seal against the dynamic shaft 12, the shape memory alloy element 22 can dimensionally contract so as to augment the compressive force applied by the coil spring 18.

Referring again to FIG. 2, the seal assembly 10 may also include a power source 36 in communication with the shape memory alloy element 22 and configured for changing the temperature of the shape memory alloy element 22. The power source 36 may be, for example, an electrical stimulus that is changeable between an energized mode configured for dimensionally contracting the shape memory alloy element 22, and a non-energized mode configured for dimensionally expanding the shape memory alloy element 22. Therefore, the power source 36 provides an "on-demand" shape memory effect. For example, for relatively high-pressure operating conditions, such as a quick burst of actuating fluid, the seal assembly 10 may require the change in crystallographic phase and accompanying contraction of the shape memory alloy element 22 on demand. For such operating conditions, the power source 36 may be pre-set to change to the energized mode to increase the temperature of the shape memory alloy element 22 to the transformation temperature, to thereby effect the dimensional contraction of the shape memory alloy element 22 and the accompanying augmented compression force applied by the coil spring 18. The power source 36 may be attached to the first end section 24 (FIGS. 6, 7, and 8) and/or the second end section 26 (FIGS. 6, 7, and 8) of the shape memory alloy element 22. Alternatively, the power source 36 may be attached to a portion of, or the entire length of the shape memory alloy element 22.

Figure 6:
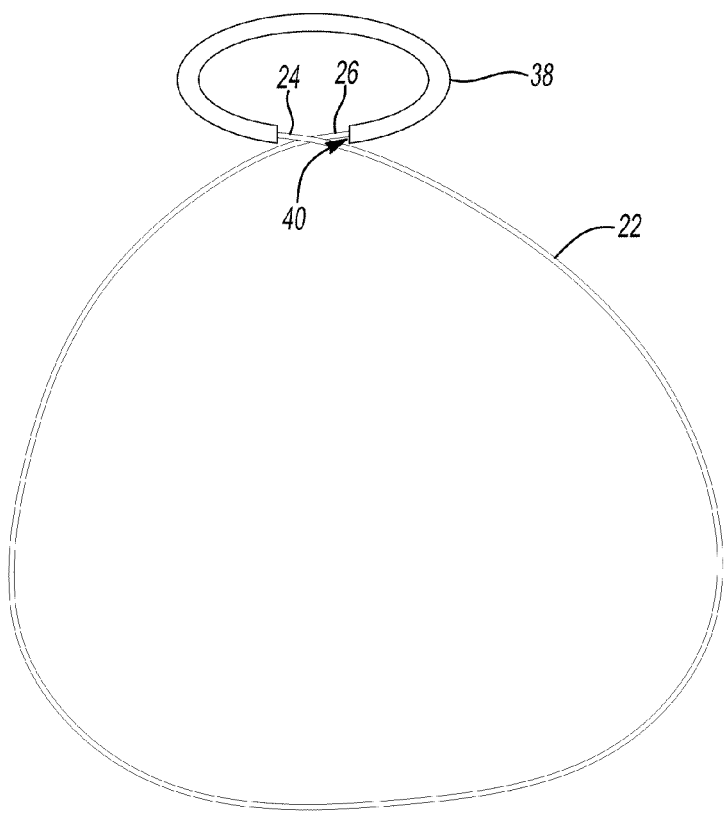
FIG. 6 is a schematic perspective view of a crimp of the seal assembly of FIG. 1.
Figure 7:
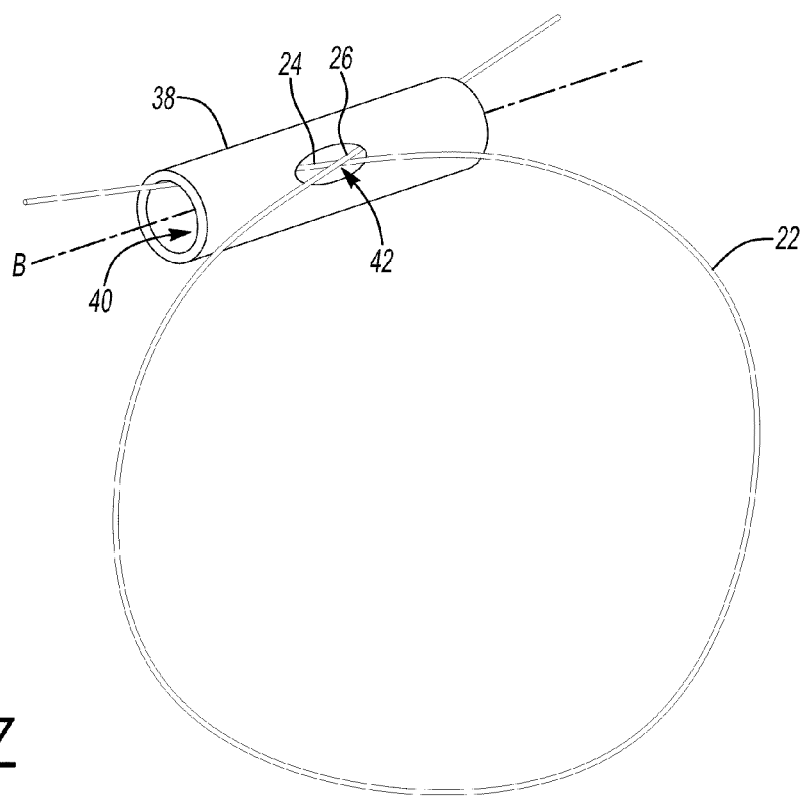
FIG. 7 is a schematic perspective view of another variation of the crimp of FIG. 6, wherein there is no dead length of the shape memory alloy element.
Figure 8:
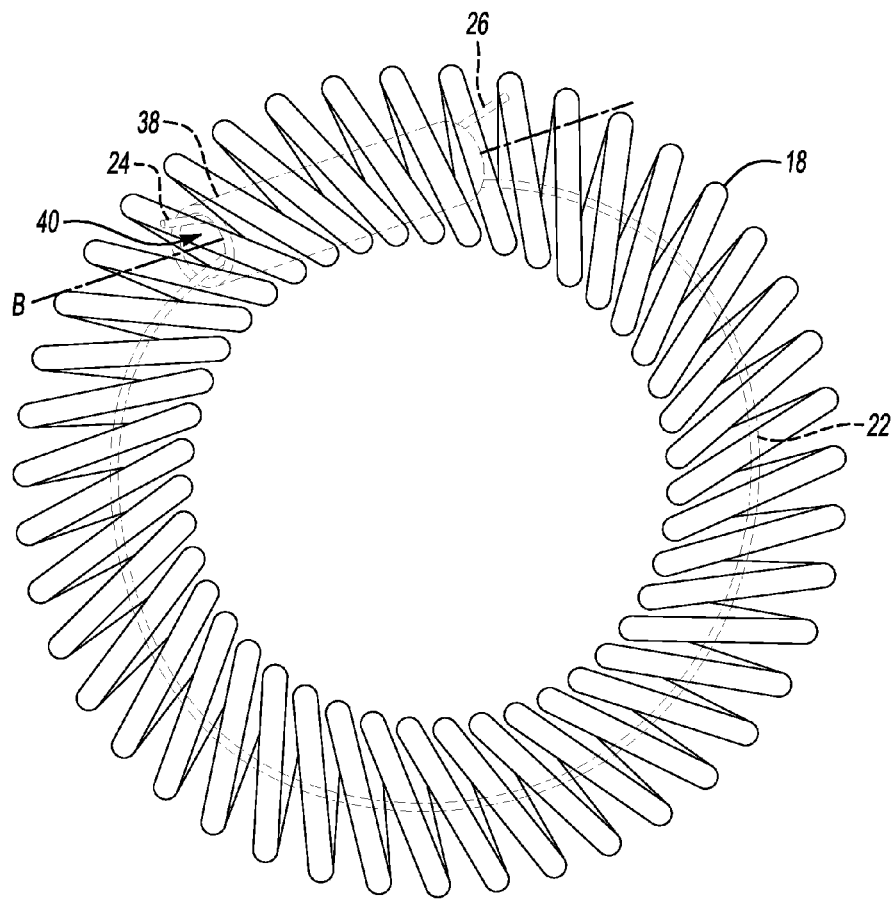
FIG. 8 is a schematic perspective view of another variation of the crimp of FIG. 6.

Referring now to FIGS. 6-8, the seal assembly 10 of FIGS. 1, 2, and 5 may further include a crimp 38 configured for sufficiently tying the first end section 24 of the shape memory alloy element 22 to the second end section 26 inside the coil spring 18 so that the first end section 24 and the second end section 26 of the shape memory alloy element 22 are crimped together at the desired length. That is, the crimp 38 may be useful for forming the shape memory alloy element 22 into a continuous loop of desired length, and may have a generally tubular shape. However, due to the relatively small space inside the coil spring 18, the crimp 38 must be suitably sized, e.g., the crimp 38 cannot be larger than the relatively small space inside the coil spring 18.

The crimp 38 may be suitably sized so as to adequately fit within the interior of the coil spring 18 (FIG. 1). For example, the crimp 38 may be flexed and/or bent, as shown in FIG. 6. In particular, the crimp 38 may be flexed and/or bent for applications including a coil spring 18 (FIG. 1) having a sufficiently large interior diameter to receive and accommodate both the shape memory alloy element 22 and the crimp 38 in the bent configuration. Alternatively, referring to FIGS. 7 and 8, the crimp 38 may have a straight, unbent configuration, e.g., for applications including a coil spring 18 (FIG. 1) having a comparatively small diameter that may only receive and accommodate the crimp 38 in the unbent configuration.

As best shown in FIG. 7, a relatively long crimp 38 is hollow and defines an inner core 40 having a longitudinal axis B. The inner core 40 is configured for enveloping a least a portion of the first end section 24 and the second end section 26 to thereby form the shape memory alloy element 22 in a continuous loop of desired length. Referring to FIG. 6, a portion of first end section 24 may overlap a portion of the second end section 26 of the shape memory alloy element 22 exterior to the inner core 40 of the crimp 38. The remaining portions of the first end section 24 and the second end section 26 may then be received and retained by the inner core 40 of the crimp 38 so as to form the continuous loop of desired length.

As best shown in FIG. 8, a relatively small crimp 38 is hollow and defines a shorter inner core 40 having the longitudinal axis B. However, in this variation, the shape memory alloy element 22 may allow for some relative motion of the shape memory alloy element 22 with respect to the coil spring 18, even while tying together the first end section 24 and the second end section 26 of the shape memory alloy element 22. This relative motion may introduce non-uniform stress along the shape memory alloy element 22, and rubbing between the shape memory alloy element 22 and coil spring 18 (FIG. 1).

Referring to FIG. 7, in one variation, the crimp 38 may further define a void 42 perpendicular to the longitudinal axis, B, of the inner core 40. The void 42 is configured for receiving a least a portion of each of the first end section 24 and the second end section 26 in overlapping relation. That is, a portion of each of the first end section 24 and the second end section 26 may overlap inside the void 42 so as to be received and retained by the inner core 40 of the crimp 38 so as to form the continuous loop of desired length.

In operation, the crimp 38 minimizes any dead length of the shape memory alloy element 22, i.e., length where the first end section 24 and the second end section 26 of the shape memory alloy element 22 are not in a tying contact. Therefore, the crimp 38 minimizes relative motion of the shape memory alloy element 22 with respect to the coil spring 18 (FIG. 1) and thereby minimizes non-uniform stress along the length of the shape memory alloy element 22, and/or rubbing between the shape memory alloy element 22 and the coil spring 18 (FIG. 1).

The seal assemblies 10 set forth above provide excellent adjustable sealing against dynamic shafts 12, e.g., rotating, reciprocating, and/or oscillating shafts. In particular, the seal assemblies 10 provide adjustable compression force and on-demand sealing across a range of operating pressures and temperatures to minimize unnecessary friction and wear between the elastic seal member 14 and the dynamic shaft 12. Therefore, the seal assemblies 10 exhibit minimal friction and leaking between the elastic seal member 14 and the dynamic shaft 12, and excellent elastic seal member service life, durability, and reliability. Additionally, the shape memory alloy elements 22 of desired length apply uniform pressure along substantially an entire length of the shape memory alloy element 22, and therefore, minimize undesired rubbing between the coil spring 18 and the shape memory alloy element 22. The crimp 38 further minimizes such undesired rubbing. The seal assemblies 10 are also cost-effective and suitable for operating conditions requiring elevated pressures.

While the best modes for carrying out the invention have been described in detail, those familiar with the art to which this invention relates will recognize various alternative designs and embodiments for practicing the invention within the scope of the appended claims.

The invention claimed is:

1. A seal assembly configured for sealing a dynamic shaft, the seal assembly comprising:
    an elastic seal member disposable in sealing communication with the dynamic shaft;
    a coil spring disposed in contact with said elastic seal member and configured for applying a compressive force to said elastic seal member;
    wherein said coil spring defines an interior surface configured for receiving said shape memory alloy element and an exterior surface configured for at least partially contacting said elastic seal member;
    a shape memory alloy element configured for applying pressure to said coil spring to thereby augment said compressive force; and
    a clip having a generally C-shape and configured for supporting substantially an entire length of said shape memory alloy element, wherein said clip is coupled to said shape memory alloy element and disposed in contact with said interior surface of said coil spring.

2. The seal assembly of claim 1, further including the dynamic shaft, wherein said shape memory alloy element changes crystallographic phase between martensite and austenite at a transformation temperature to thereby change dimension and augment said compressive force in a radial direction generally perpendicular to said dynamic shaft.

3. The seal assembly of claim 1, wherein said shape memory alloy element augments said compressive force to thereby compress said elastic seal member against the dynamic shaft.

4. The seal assembly of claim 1, wherein said shape memory alloy element has a form selected from the group comprising springs, tapes, wires, bands, continuous loops, and combinations thereof.

5. The seal assembly of claim 1, wherein said shape memory alloy element includes nickel and titanium.

6. The seal assembly of claim 2, wherein said shape memory alloy element has a transformation temperature of from about −55° C. to about 250° C.

7. The seal assembly of claim 2, further including a plurality of said shape memory alloy elements each having a different transformation temperature, wherein at least one of said plurality of shape memory alloy elements is disposed in contact with said coil spring.

8. The seal assembly of claim 1, wherein said coil spring is toroidal and continuously encircles at least a portion of said elastic seal member.

9. The seal assembly of claim 2, wherein said elastic seal member defines an interior channel configured for receiving said coil spring and circumferentially encircles at least a portion of said dynamic shaft.

10. The seal assembly of claim 1, further including a rigid housing in structural communication with said elastic seal member.

11. The seal assembly of claim 1, further including a power source in communication with said shape memory alloy element and configured for changing the temperature of said shape memory alloy element;
    wherein said power source is changeable between an energized mode configured for dimensionally contracting said shape memory alloy element and a non-energized mode configured for dimensionally expanding said shape memory alloy element.

12. A seal assembly configured for sealing a dynamic shaft, the seal assembly comprising:
    an elastic seal member disposable in sealing communication with the dynamic shaft;
    a coil spring disposed in contact with said elastic seal member and configured for applying a compressive force to said elastic seal member;
    wherein said coil spring defines an interior surface configured for receiving said shape memory alloy element and an exterior surface configured for at least partially contacting said elastic seal member;
    a shape memory alloy element configured for applying pressure to said coil spring to thereby augment said compressive force; and
    a clip having a generally C-shape and configured for supporting substantially an entire length of said shape memory alloy element, wherein said clip is coupled to said shape memory alloy element and disposed in contact with said exterior surface of said coil spring.

13. The seal assembly of claim 12, further including the dynamic shaft, wherein said shape memory alloy element changes crystallographic phase between martensite and austenite at a transformation temperature to thereby change dimension and augment said compressive force in a radial direction generally perpendicular to said dynamic shaft.

14. The seal assembly of claim 12, wherein said shape memory alloy element augments said compressive force to thereby compress said elastic seal member against the dynamic shaft.

15. The seal assembly of claim 12, further including a plurality of said shape memory alloy elements each having a different transformation temperature, wherein at least one of said plurality of shape memory alloy elements is disposed in contact with said coil spring.

16. The seal assembly of claim 12, wherein said coil spring is toroidal and continuously encircles at least a portion of said elastic seal member.

17. The seal assembly of claim 12, wherein said shape memory alloy has a transformation temperature of from about −55° C. to about 250° C.

18. The seal assembly of claim 12, further including a power source in communication with said shape memory alloy element and configured for changing the temperature of said shape memory alloy element;
    wherein said power source is changeable between an energized mode configured for dimensionally contracting said shape memory alloy element and a non-energized mode configured for dimensionally expanding said shape memory alloy element.

19. A seal assembly configured for sealing a dynamic shaft, the seal assembly comprising:
    an elastic seal member disposable in sealing communication with the dynamic shaft;
    a coil spring disposed in contact with said elastic seal member and configured for applying a compressive force to said elastic seal member;
    a shape memory alloy element having a first end section and a second end section and configured for applying pressure to said coil spring to thereby augment said compressive force; and
    a crimp configured for tying said first end section of said shape memory alloy element to said second end section and disposed inside said coil spring;
    wherein said crimp has a generally tubular shape defining an inner core having a longitudinal axis and configured for enveloping at least a portion of said first end section and said second end section to thereby form said shape memory alloy element together with said crimp into a continuous loop of desired length.

20. The seal assembly of claim 19, wherein said crimp further defines a void perpendicular to said longitudinal axis and configured for receiving at least a portion of each of said first end section and said second end section in overlapping relation.

* * * * *